(12) United States Patent
Murakami et al.

(10) Patent No.: US 8,416,661 B2
(45) Date of Patent: Apr. 9, 2013

(54) OPTICAL DISK DEVICE AND POWER SUPPLY METHOD

(75) Inventors: Manabu Murakami, Kawasaki (JP); Shigeru Fukinuki, Kokubunji (JP); Naoki Kimura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/158,253

(22) Filed: Jun. 10, 2011

(65) Prior Publication Data
US 2011/0235498 A1  Sep. 29, 2011

Related U.S. Application Data

(63) Continuation of application No. 12/415,608, filed on Mar. 31, 2009, now abandoned.

(30) Foreign Application Priority Data

Mar. 31, 2008 (JP) .................................. 2008-094157

(51) Int. Cl.
*G11B 5/00* (2006.01)

(52) U.S. Cl.
USPC ........................................ 369/47.53; 369/116

(58) Field of Classification Search .............. 369/47.53, 369/116; 372/38.02
See application file for complete search history.

(56) References Cited

U.S. PATENT DOCUMENTS

| | | | |
|---|---|---|---|
| 6,724,793 B2 | 4/2004 | Nagara | |
| 6,842,469 B2 | 1/2005 | Nagara | |
| 6,920,163 B2 | 7/2005 | Ishii | |
| 7,928,601 B2 | 4/2011 | Ozawa et al. | |
| 2002/0131358 A1 | 9/2002 | Nagara | |
| 2004/0145992 A1* | 7/2004 | Vogel et al. | 369/53.26 |
| 2005/0265182 A1* | 12/2005 | Liu et al. | 369/47.53 |
| 2006/0044968 A1* | 3/2006 | Narumi et al. | 369/47.5 |
| 2006/0139828 A1 | 6/2006 | Ozawa et al. | |
| 2006/0215532 A1* | 9/2006 | Zhao et al. | 369/116 |
| 2008/0056086 A1* | 3/2008 | Kuroda | 369/53.26 |
| 2008/0080576 A1* | 4/2008 | Sekine et al. | 372/38.02 |
| 2009/0243579 A1* | 10/2009 | Lim et al. | 323/284 |
| 2010/0150190 A1* | 6/2010 | Masood et al. | 372/29.023 |

FOREIGN PATENT DOCUMENTS

| | | |
|---|---|---|
| JP | 2000 244052 A2 | 9/2000 |
| JP | 2002 260266 A2 | 9/2002 |
| JP | 2003 078203 A2 | 3/2003 |
| JP | 2006 187152 A2 | 7/2006 |
| JP | 2007 159343 A2 | 6/2007 |

* cited by examiner

*Primary Examiner* — Wayne Young
*Assistant Examiner* — Brenda Bernardi
(74) *Attorney, Agent, or Firm* — Knobbe Martens Olson & Bear LLP

(57) ABSTRACT

According to one embodiment, an optical disk device includes types of semiconductor laser diodes configured to emit laser light of different wavelengths, an output control circuit configured to control light output of each semiconductor laser diode, and a composite power source configured to generate voltages required for driving the types of semiconductor laser diodes and operating the output control circuit from a single power source voltage and to selectively output the generated voltages. The composite power source includes an input port to input an external control signal at a time of voltage selection and is configured to change the output voltage stepwise in response to the control signal.

11 Claims, 5 Drawing Sheets

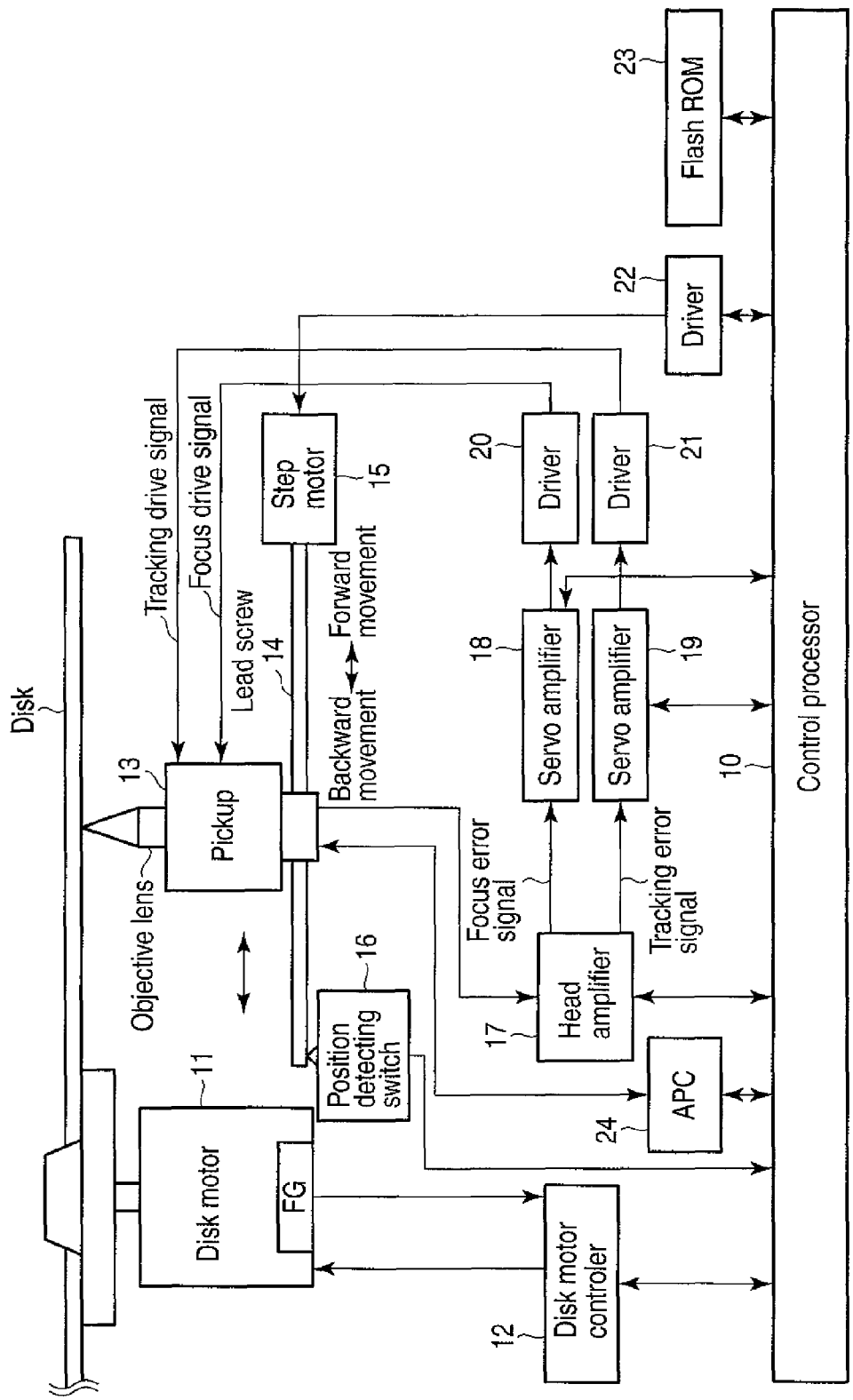
F I G. 1

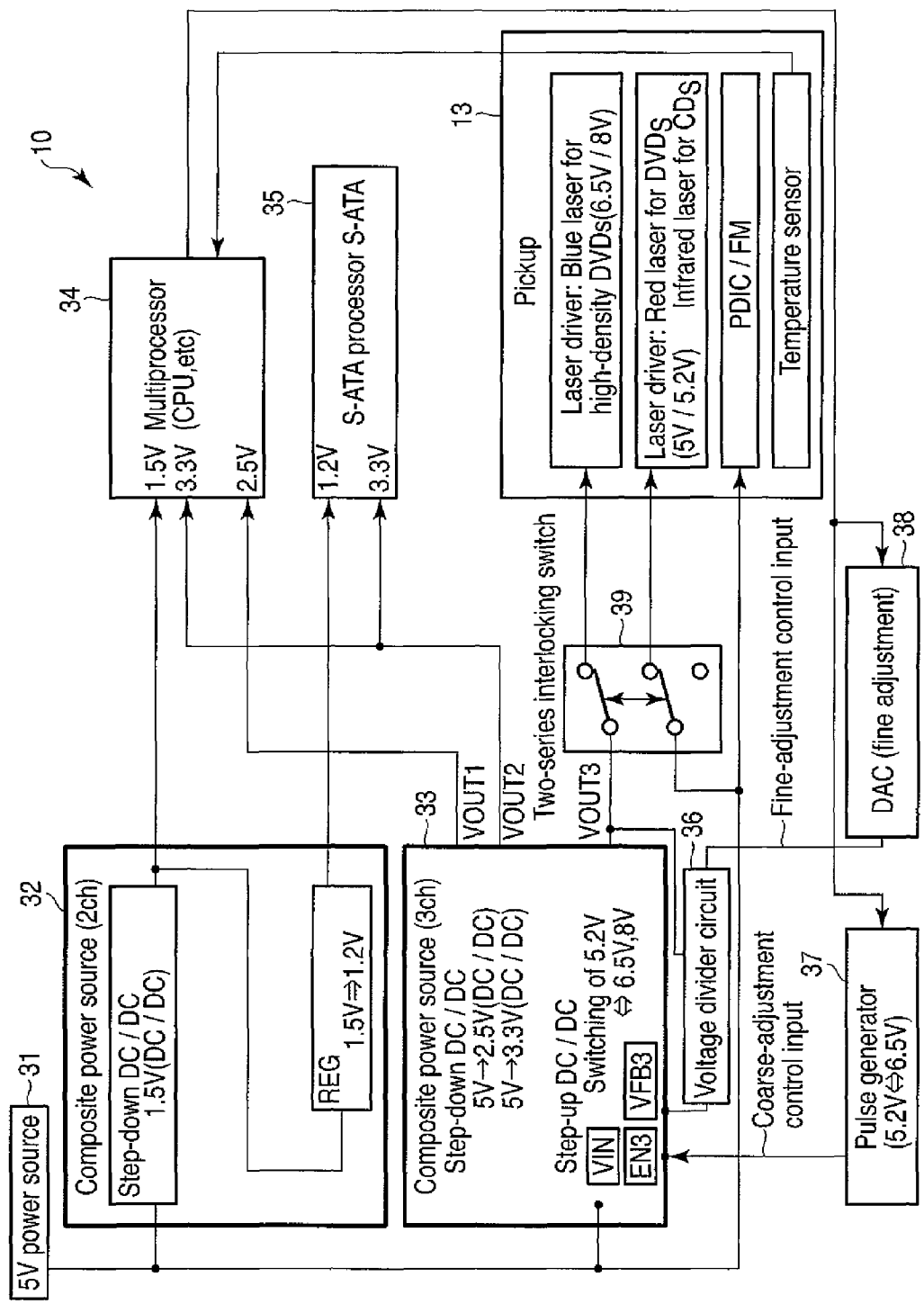
F I G. 2

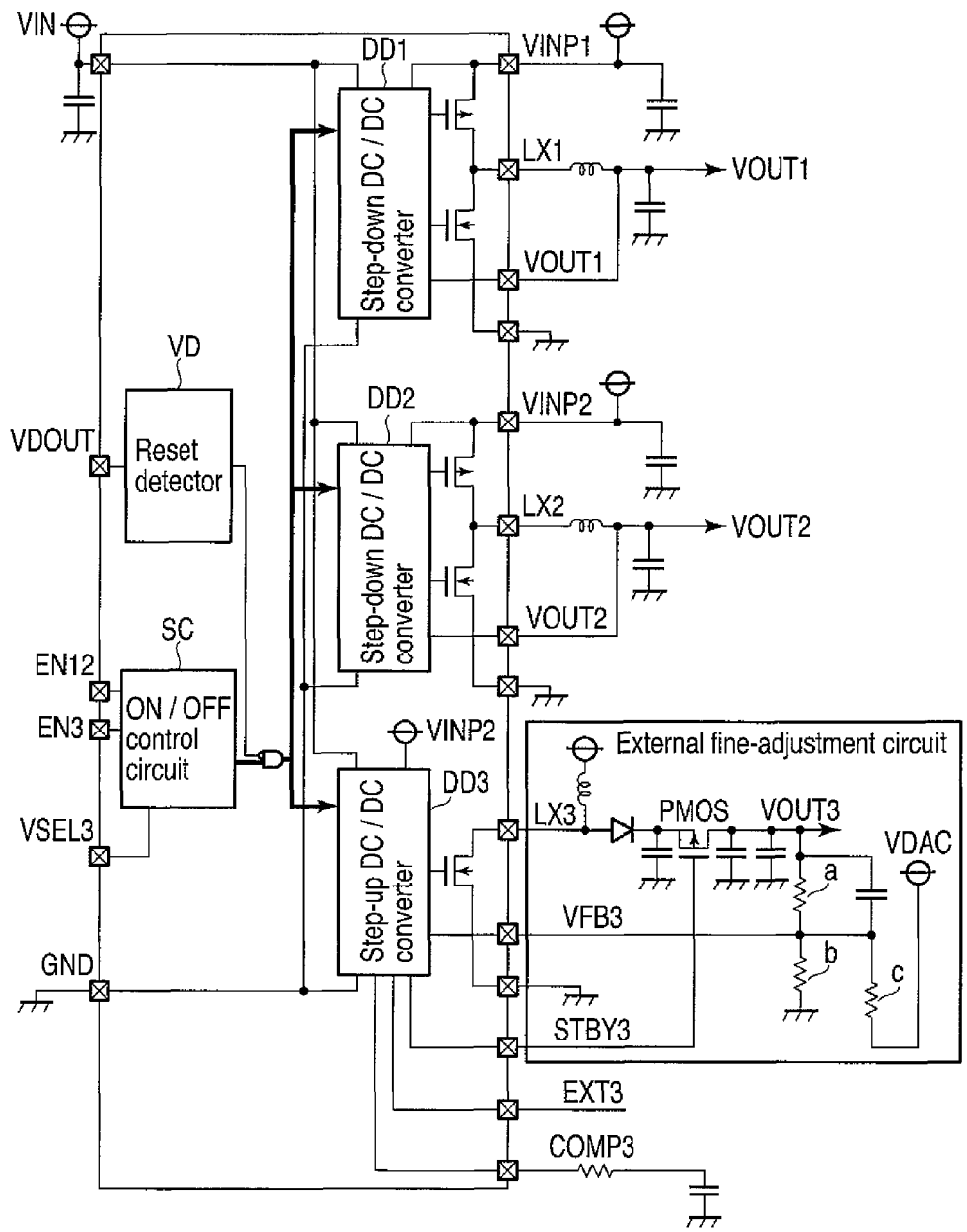
F I G. 3

OPTICAL DISK DEVICE AND POWER SUPPLY METHOD

CROSS-REFERENCE TO RELATED APPLICATIONS

This application is a continuation of U.S. patent application Ser. No. 12/415,608, filed on Mar. 31, 2009 and entitled "OPTICAL DISK DEVICE AND POWER SUPPLY METHOD," which is based upon and claims the benefit of priority from Japanese Patent Application No. 2008-094157, filed Mar. 31, 2008, the entire contents of which are incorporated herein by reference.

BACKGROUND

1. Field

One embodiment of the present invention relates to an optical disk device and power supply method that utilize a single power source voltage to generate different output voltages for driving types of semiconductor laser diodes.

2. Description of the Related Art

Recently, the integration density of digital ICs has been markedly enhanced. Along with this, an attempt is made to reduce the cost by integrating control hardware of an optical disk device as a digital IC and using software for digital control of a laser light source.

A typical optical disk device has types of semiconductor laser diodes for use in recording and reproduction operations of a CD, DVD and high-density DVD. The digital IC is a control processor provided for operation settings of an automatic power control (APC) circuit that controls laser outputs (laser powers) of the semiconductor laser diodes.

The semiconductor laser diodes require voltages different from each other. Conventionally, the power supply circuit in the optical disk device utilizes a single power source voltage to generate the voltages (for example, see Jpn. Pat. Appln. KOKAI Publication No. 2003-78203). In a general example, a blue laser diode for high-density DVDs is driven by means of voltages of 6.5 and 8V, and a red laser diode for DVDs and an infrared laser diode for CDs are driven by means of voltages of 5 and 5.2V. Regarding the control processor, voltages of 1.2, 1.5, 2.5 and 3.3V are required for operation. The voltages of 1.2, 1.5, 2.5 and 3.3V are produced by stepping down the power source voltage of 5V and the voltages of 5.2, 6.5 and 8V are produced by stepping up the power source voltage of 5V.

Since the types of semiconductor laser diodes are selectively used in the recording and reproduction operations for an optical disk, the power supply circuit needs to output voltages switched between the voltages of 5 and 5.2V and the voltages of 6.5 and 8V. For example, an inrush current will not occur upon change in the output voltage between 5 and 5.2V. However, an inrush current will occur upon change in the output voltage between 5.2, 6.5 and 8V. If the inrush current occurs, it becomes difficult to stably operate the control processor and drive the semiconductor laser diode. As a countermeasure against the inrush current, the voltage switching may be eliminated by providing a plurality of independent power supply circuits, but this countermeasure resultantly increases the number of parts and the mounting area.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary block diagram showing the configuration of an optical disk device according to one embodiment of the invention;

FIG. 2 is an exemplary diagram showing a power supply circuit connected to a control processor and pickup in the optical disk device shown in FIG. 1;

FIG. 3 is an exemplary diagram showing the configuration of a second composite power source shown in FIG. 2;

DETAILED DESCRIPTION

Figure 4:
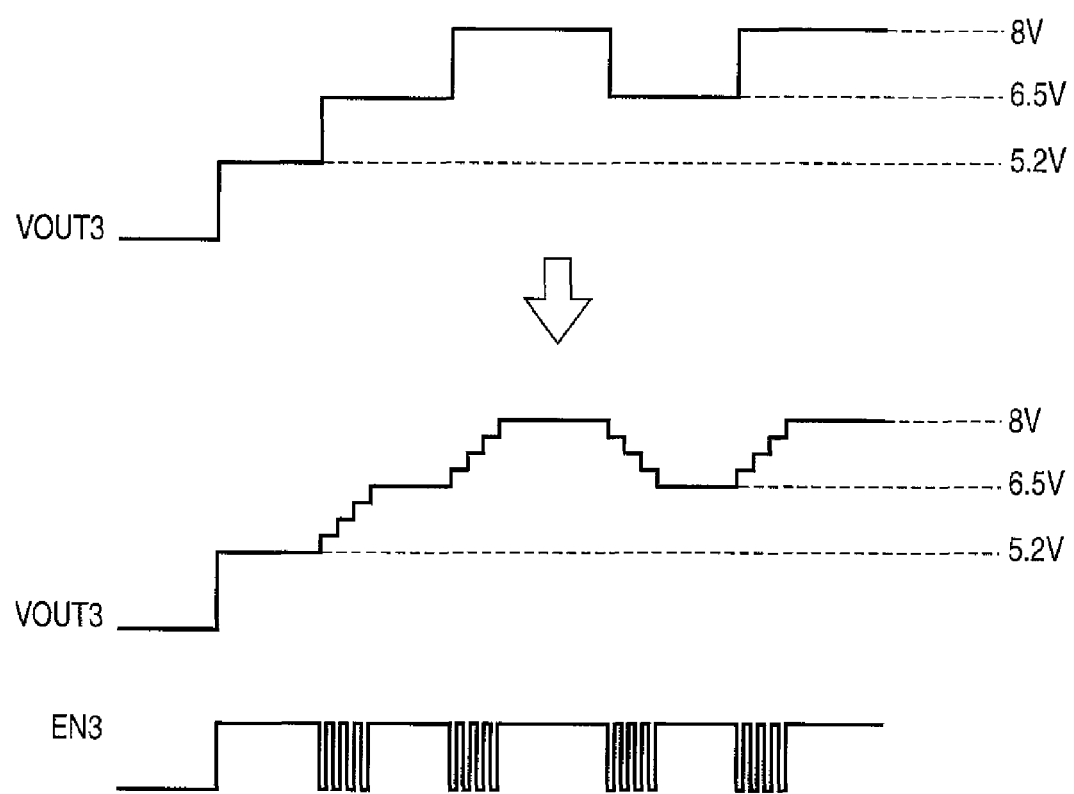
FIG. 4 is an exemplary diagram for illustrating a stepwise change in output voltages according to a control signal from a multiprocessor shown in FIG. 2.

Various embodiments according to the invention will be described hereinafter with reference to the accompanying drawings.

According to one embodiment of the invention, there is provided an optical disk device comprising: types of semiconductor laser diodes configured to emit laser light of different wavelengths; an output control circuit configured to control light output of each semiconductor laser diode; and a composite power source configured to generate, from a single power source voltage, voltages required for driving the types of semiconductor laser diodes and operating the output control circuit and to selectively output the generated voltages, the composite power source including an input port to input an external control signal at a time of voltage selection and being configured to change the output voltage stepwise in response to the control signal.

According to one embodiment of the invention, there is provided a power supply method for an optical disk device including types of semiconductor lasers configured to emit laser light of different wavelengths, an output control circuit configured to control light output of each semiconductor laser, and a composite power source configured to generate, from a single power source voltage, voltages required for driving the types of semiconductor lasers and operating the output control circuit and to selectively output the generated voltages, the method comprising: providing an input port in the composite power source to input an external control signal at a time of voltage selection; and changing the output voltage of the composite power source stepwise by the control signal input to the input port.

In the optical disk device and power supply method, the external control signal is input to the input port of the composite power source at the time of voltage selection and the output voltage of the composite power source is changed stepwise upon input of the control signal to the input port. With this configuration, it is not necessary to provide a plurality of independent power supply circuits. Further, the control signal may be generated by the output control circuit. Therefore, occurrence of an inrush current can be suppressed without increasing the number of parts and the mounting area.

An optical disk device according to one embodiment of the invention will be described below.

FIG. 1 shows the configuration of the optical disk device. An optical disk is rotatably mounted on a disk motor 11. A frequency generator FG is provided on the disk motor 11. A control processor 10 compares a rotation angle signal from the frequency generator FG with an internal reference frequency and controls a disk motor controller 12 to set the disk motor 11 to a predetermined rotational direction and rotation speed based on a difference signal obtained as a result of comparison.

A pickup 13 is provided to face the information recording surface of the disk, supported on a sliding shaft (not shown) to be movable in a radial direction of the disk, and moved by a lead screw 14. A step motor 15 is a feeding motor of the pickup 13 and the rotating shaft thereof is directly coupled with the lead screw 14. A position detecting switch 16 is arranged in a home position of the pickup 13 and detects that the pickup 13 reaches the home position when the pickup 13 moves to the inner peripheral side of the disk and comes into contact with the position detecting switch 16. The position detecting switch 16 is used to initialize the position of the pickup 13.

Laser light is divided into three beams by a diffraction grating, converged by an objective lens via an optical component (not shown) provided in the pickup 13 and applied to form a spot on the information recording surface of the disk. Laser light reflected from the disk returns to the objective lens and is made incident on an 8-division detector via the internal optical component. A focus error signal is based on an astigmatism method and a tracking error signal is based on a DPP method. The detector performs a current-voltage conversion process for incident light by means of an IC in the pickup and outputs a signal obtained as a result of conversion to a predetermined head amplifier 17.

The objective lens is supported by a spring to be movable in an optical axis direction (focusing direction) of laser light and in a radial direction (tracking direction) of the disk. In this example, coils and magnets are provided to drive the objective lens in the focusing direction and tracking direction. Such a two-directional movement member is called a 2-axis actuator. The focusing coil is driven by a focus drive signal output from a driver 20 and the tracking coil is driven by a tracking drive signal output from a driver 21. The drivers 20 and 21 are respectively connected to servo amplifiers 18 and 19. The servo amplifier 18 is controlled by the control processor 10 to generate a focus drive signal in accordance with the focus error signal from the head amplifier 17. The servo amplifier 19 is controlled by the control processor 10 to generate a tracking drive signal in accordance with the tracking error signal from the head amplifier 17.

The control processor 10 acquires disk address information from a high-frequency (RF) signal obtained as an information signal and other signals from the head amplifier 17 by means of CD, DVD and high-density recording DVD demodulators and address decoders (not shown). In the process of controlling a step motor 15, the control processor 10 generates 2-phase sinusoidal signals, power-amplifies the signals, and outputs the thus amplified signals to the driver 22.

FIG. 2 shows a power supply circuit connected to the control processor 10 and pickup 13 in the optical disk device shown in FIG. 1. The control processor 10 includes a multiprocessor 34 that makes operation settings of an automatic power control circuit 24 and an S-ATA processor 35 that operates as an input and output interface to an external device. The power supply circuit includes a power source 31 that stabilizes an external voltage of 5V and outputs it, a first composite power source 32 that outputs a voltage of 1.5V to the multiprocessor 34 and outputs a voltage of 1.2V to the S-ATA processor 35, and a second composite power source 33 that outputs a voltage of 2.5V to the multiprocessor 34, outputs a voltage of 3.3V to the multiprocessor 34 and S-ATA processor 35, and outputs voltages of 5.2, 6.5 and 8V to the pickup 13. The composite power sources 32, 33 step up or step down the voltage of 5V supplied from the power source 31 to output the above voltages. The voltages of 5.2, 6.5 and 8V from the composite power source 33 are switched by a switch 39 so as to be used for the blue laser diode and for the red or infrared laser diode, respectively. Further, The control signal from the multiprocessor 34 is supplied to a pulse generator 37 and a digital-to-analog converter (DAC) 38. The pulse generator 37 converts the control signal into a coarse-adjustment pulse signal which is input to an input terminal EN3 of the composite power source 33 to change the output voltage stepwise. The DAC 38 converts the control signal into a fine-adjustment analog signal which is input to a voltage divider circuit 36 connected between an input terminal VFB3 and output terminal VOUT3 of the composite power source 33 to finely adjust the output voltage from the output terminal VOUT3.

FIG. 3 shows the configuration of the composite power source 33. The composite power source 33 includes a step-down DC/DC converter DD1, step-down DC/DC converter DD2, step-up DC/DC converter DD3, reset detector VD and on/off control circuit SC. The step-down DC/DC converter DD1 converts a voltage of 5V to a voltage of 2.5V and outputs the thus converted voltage from an output terminal VOUT1. The step-down DC/DC converter DD2 converts a voltage of 5V to a voltage of 3.3V and outputs the thus converted voltage from an output terminal VOUT2. The step-up DC/DC converter DD3 converts a voltage of 5V to a voltage of 5.2, 6.5 or 8V and outputs the thus converted voltage from the output terminal VOUT3. The reset detector VD detects a reset signal with respect to the DC/DC converters DD1, DD2, DD3. The on/off control circuit SC outputs an on/off control signal with respect to the DC/DC converters DD1, DD2, DD3. The on/off control signal is supplied to the DC/DC converters DD1, DD2, DD3 while the reset signal is not detected by the reset detector VD. Circuits for stabilizing the output voltages are added to the respective output terminals VOUT1, VOUT2, VOUT3 of the DC/DC converters DD1, DD2, DD3. Further, an external fine-adjustment circuit is connected to the output terminal VOUT3 of the DC/DC converter DD3. The voltage divider circuit 36 is configured by resistors a, b, and c provided as part of the external fine-adjustment circuit. The fine adjustment operation is performed to cope with a temperature variation of the pickup 13. In this case, VDAC denotes a control input terminal from the DAC 38, VFB3 denotes an output feedback terminal, LX3 denotes a switching terminal and STBY3 denotes a PMOS control terminal. A CR circuit configured between the output terminal VOUT3, output feedback terminal VFB3 and control input terminal VDAC finely adjusts voltage which has been set at the output terminal VOUT3 according to voltage from the control input terminal VDAC.

When no pulse signal is input to the input terminal EN3 of the composite power source 33, voltages of 5.2, 6.5 and 8V are output shown in the upper-part of FIG. 4, in the same manner as that in a conventional circuit configuration. On the other hand, when a signal going high and a pulse signal are input to the input terminal EN3 of the composite power source 33, the composite power source 33 outputs voltage that changes stepwise between 6.5 and 8V as shown in the lower-part of FIG. 4 from the output terminal VOUT3.

Further, the composite power source 33 can change the output voltage stepwise between 6.5 and 8V each time a pulse signal is input to the input terminal EN3 as shown in FIG. 4. In this case, since the voltage does not exceed the voltage range of 6.5 to 8V, no circuit destruction will occur.

Figure 5:
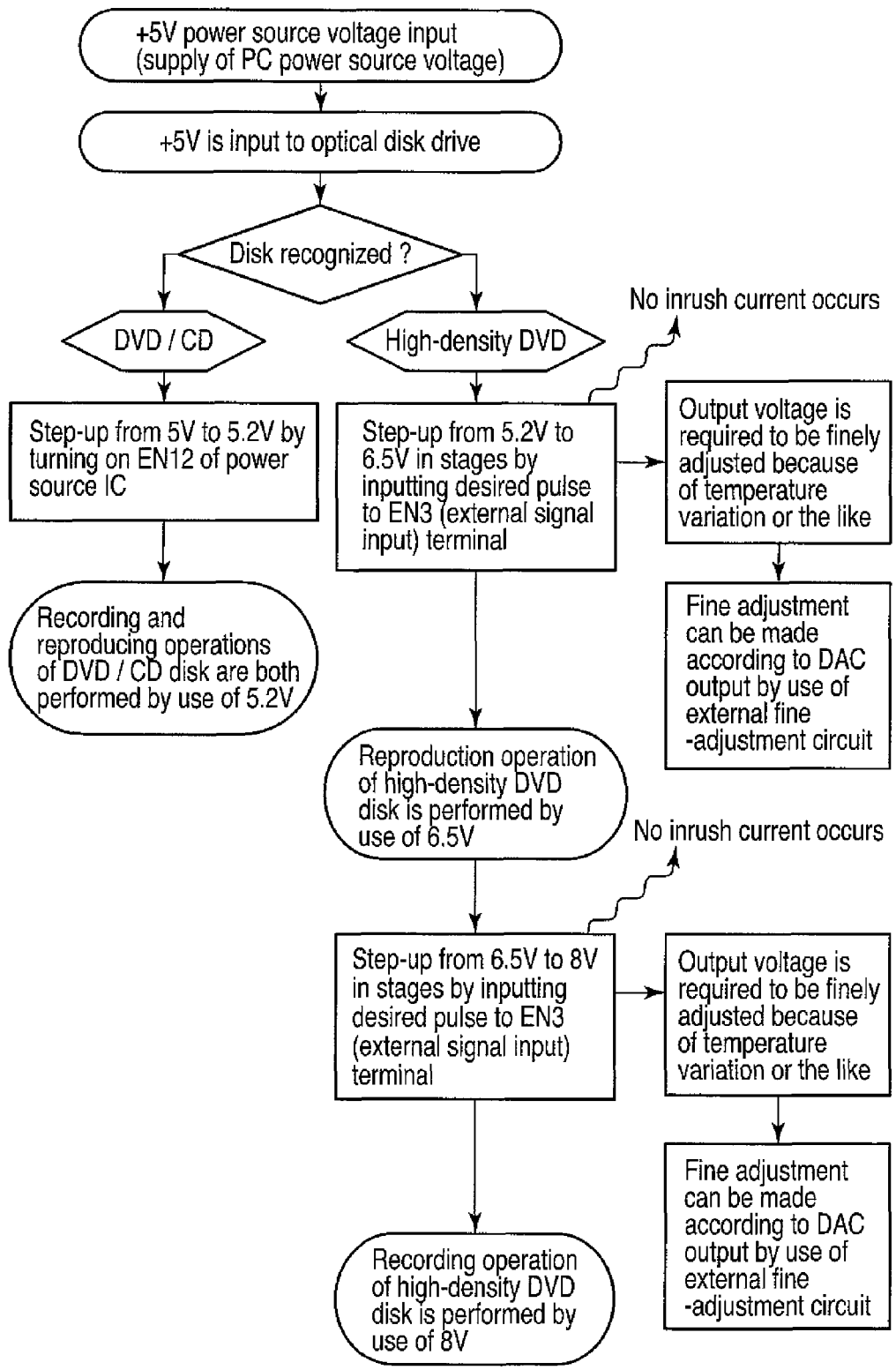
FIG. 5 is an exemplary diagram for illustrating switching conditions of output voltages by means of the power supply circuit shown in FIG. 2.

The power supply circuit switches the output voltage in a switching condition as shown in FIG. 5. That is, a voltage of 5V supplied from an external equipment is first input to the power source 31 and the voltage is input to the optical disk drive. Thereafter, a disk recognition process is performed. At this time, if a DVD or CD is detected, the voltage is raised from 5 to 5.2V by turning on the enable terminal EN12 of the power supply circuit and the recording/reproduction operation of the DVD or CD is performed on the voltage of 5.2V. On the other hand, if a high-density DVD is detected, the voltage is raised stepwise from 5.2 to 6.5V by arbitrarily inputting a pulse signal as shown in FIG. 4 to the input terminal EN3. Occurrence of an inrush current is suppressed during the operation of raising the voltage stepwise. The reproduction operation of the high-density DVD is performed on the voltage of 6.5V. In this state, when a pulse signal is arbitrarily input to the input terminal EN3 as shown in FIG. 4 again, the voltage is raised stepwise from 6.5 to 8V. Occurrence of an inrush current is suppressed during the operation of raising the voltage stepwise. The recording operation of the high-density DVD is performed on the voltage of 8V. Even when the output voltage has been set to 6.5 or 8.5V, the output voltage is finely adjustable according to voltage input from the DAC 38 by means of the external fine-adjustment circuit in the case where such adjustment is required to cope with a variation in the temperature or the like.

In this embodiment, the external control signal is input to the input terminal EN3 of the composite power source 33 at the time of voltage selection and the output voltage of the composite power source 33 is changed stepwise upon input of the control signal. With this configuration, it is not necessary to provide a plurality of independent power supply circuits. Further, the control signal may be generated by the multiprocessor 10. Therefore, occurrence of an inrush current can be suppressed without increasing the number of parts and the mounting area.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An optical disk device comprising:
a plurality of semiconductor laser diodes configured to emit laser lights of different wavelengths;
an output controller configured to control light output of semiconductor laser diodes; and
a composite power source configured to generate a plurality of voltage power supplies from a single voltage power source in order to drive the plurality of semiconductor laser diodes and to operate the output controller, and configured to selectively output the generated power supplies, the composite power source comprising an input port configured to receive a first control signal at a time of voltage selection and being configured to cause an output voltage to change from a selected first constant voltage to a selected second constant voltage which is higher than the first constant voltage, and to cause the output voltage to change from the second constant voltage to the first constant voltage which is lower than the second constant voltage, via multiple voltage levels between the selected first and second constant voltages in response to the first control signal,
wherein the first control signal comprises a pulse train, and the composite power source is configured to cause the output voltage to change stepwise each time a pulse of the pulse train is input to the input port.

2. The optical disk device of claim 1, wherein the composite power source is configured in such a manner that the output voltage is changed in a predetermined range when the first control signal is received.

3. The optical disk device of claim 1, wherein the composite power source is configured in such a manner that the output voltage is further adjusted in response to a second control signal received at the input port.

4. The optical disk device of claim 1, wherein the first control signal is generated by a control processor provided in a control processing section.

5. The optical disk device of claim 3, wherein the second control signal is generated by a control processor comprised in the output controller.

6. A power supply method for an optical disk device comprising a plurality of semiconductor laser diodes configured to emit laser lights of different wavelengths, an output controller configured to control light output of semiconductor laser diodes, and a composite power source configured to generate a plurality of voltage power supplies from a single voltage power source in order to drive the plurality of semiconductor laser diodes and to operate the output controller, and configured to selectively output the generated power supplies, the method comprising:
receiving a first control signal at an input port of the composite power source at a time of voltage selection; and
causing an output voltage of the composite power source to change from a selected first constant voltage to a selected second constant voltage which is higher than the first constant voltage and causing the output voltage to change from the second constant voltage to the first constant voltage which is lower than the second constant voltage, via multiple voltage levels between the selected first and second constant voltages based on the received first control signal,
wherein the first control signal comprises a pulse train, and the composite power source is configured to cause the output voltage to change stepwise each time a pulse of the pulse train is input to the input port.

7. The power supply method of claim 6, further comprising changing the output voltage of the composite power source in a predetermined range when the first control signal is received at the input port.

8. The power supply method of claim 6, further comprising adjusting the output voltage of the composite power source in response to a second control signal received at the input port.

9. The power supply method of claim 6, further comprising generating the first control signal by a control processor comprised in the output controller.

10. The power supply method of claim 8, further comprising generating the second control signal by a control processor comprised in the output controller.

11. The power supply method of claim 7, further comprising adjusting the output voltage of the composite power source in response to the second control signal received at the input port.

* * * * *